United States Patent [19]

Erman

[11] Patent Number: 4,832,432
[45] Date of Patent: May 23, 1989

[54] OPTICAL SWITCHING ELEMENT BETWEEN TWO OPTICAL GUIDES AND OPTICAL SWITCHING MATRIX CONSTITUTED BY THESE SWITCHING ELEMENTS

[75] Inventor: Marko Erman, Paris, France

[73] Assignee: U.S. Philips Corp., New York, N.Y.

[21] Appl. No.: 136,581

[22] Filed: Dec. 22, 1987

[30] Foreign Application Priority Data

Dec. 23, 1986 [FR] France ................................. 86 18046

[51] Int. Cl.$^4$ ................................................. G02B 6/10
[52] U.S. Cl. .............................. 350/96.14; 350/96.13
[58] Field of Search ........................... 350/96.14, 96.13

[56] References Cited

U.S. PATENT DOCUMENTS

| | | | |
|---|---|---|---|
| 4,185,884 | 1/1980 | McMahon | 350/96.14 |
| 4,391,486 | 7/1983 | Papuchon et al. | 350/96.14 |

FOREIGN PATENT DOCUMENTS

| | | | |
|---|---|---|---|
| 147122 | 11/1981 | Japan | 350/96.14 |
| 176730 | 10/1984 | Japan | 350/96.14 |
| 208036 | 9/1986 | Japan | 350/96.14 |

*Primary Examiner*—William L. Sikes
*Assistant Examiner*—Robert E. Wise
*Attorney, Agent, or Firm*—William L. Botjer

[57] ABSTRACT

An optical switching element including two parallel optical guides $G_1$ and $G_2$ each constituted by a strip of a semiconductor material having a refractive index $n_1$ formed on a semiconductor substrate having a lower refractive index $n_0$, the switching operation being obtained by the effect of voltages applied to electrodes arranged in the switching zone, characterized in that the latter is constituted by a strip of the same semiconductor material as the guides, which extends between the latter over a coupling length D between the abscissae $-D/2$ and $+D/2$ indicated on the orientated longitudinal axis of symmetry, and in that the electrodes are at least three in number, of which a first electrode permits of applying a reference voltage to the substrate, a second electrode extends substantially at the surface of the second guide from the abscissa $-D$ to the abscissa $-\epsilon$, $\epsilon$ being small with respect to D, and a third electrode extends substantially at the surface of the first guide from the abscissa $+\epsilon$ to the abscissa $+D$, the second and third electrodes forming strips whose longitudinal axes of symmetry enclose with the optical axes of the second and first guides, respectively, an angle $-\theta$ defined on first approximation by the relation:

$$\theta_2 \approx 2(n_1 - n_0)/n_1.$$

13 Claims, 6 Drawing Sheets

OPTICAL SWITCHING ELEMENT BETWEEN TWO OPTICAL GUIDES AND OPTICAL SWITCHING MATRIX CONSTITUTED BY THESE SWITCHING ELEMENTS

BACKGROUND OF THE INVENTION

The invention relates to an optical switching element including two optical guides arranged in parallel, which are each constituted by a strip of a semiconductor material having a first refractive index formed on a semiconductor substrate of a material having a second lower refractive index such that the light is confined in the strip forming the guide, the dimensions of these guides being such that they each transport a monomode wave and the switching operation being obtained by means of the effect of voltages applied to the electrodes arranged in the switching zone.

The invention further relates to an optical switching matrix constituted by a number NxN of these switching elements.

The invention is used for switching optical signals transported through optical fibers, for example in the telecommunication field, in which the switching between numerous optical fibres must be made possible in order to avoid that the optical signals transported through the fibres have to be converted into electrical signals during the switching between the different subscribers.

An optical switching element apt to form a switching matrix, such as defined in the opening paragraph, is known from the publication entitled "Low-loss GaAs-$Ga_{1-x}Al_xAs$ double-heterostructure directional coupler" by A. Carenco, P. Sansonetti et al in "Technical Digest", of the 7th Topical Metting on Integrated and Guide-Wave Optics", Orlando Hyatt Hotel, Kissimee, Fla., Apr. 24-26, 1984, designated by Th B 4-1.

This publication discloses a switching element constituted by two optical guides formed by strips of GaAs. These strips are arranged in parallel and are formed one beside the other at a very small relative distance at the surface of a layer of $Ga_{1-x}Al_xAx$, which serves as a confinement layer between these optical guides and the flat substrate of GaAs. Another layer of $Ga_{1-x}Al_xAs$ covers each of the strips forming the guides. The latter are formed on the other hand in relief on the substrate by etching of a starting layer. Schottky electrodes are finally formed on the surface of each of the guides, while the opposite surface of the substrate is provided with a layer forming an ohmic contact.

The guides each transport a monomode wave and due to the small distance separating them laterally a polarization applied to one or the other of the guides permits of changing the coupling of the two monomode guides, thus ensuring the desired switching.

A switching matrix can be formed from such switching elements by joining the guides of an element to the guides of another element by means of curved guide portions.

However, such a structure has several disadvantages. In the first place, the lateral distance between the strips on the substrate is an extremely critical factor for the behaviour of the switching element. Now, the lateral distance between two semiconductor strips formed on a surface can be controlled only with difficulty. In the device described in the aforementioned publication, this lateral distance is of the order of 2 to 3 µm. Since the coupling length, i.e. the longitudinal dimension of the optical guides, is associated with this lateral distance, this longitudinal dimension in this case is several millimeters, which is really enormous for dimension of integrated circuits.

Moreover, curved guide portions connect the switching elements to each other in order to form a matrix. These portions establish necessarily this connection at a very small angle, which results in that such a matrix occupies a very large surface area. On the other hand, the methods of etching or of epitaxial growth used to form these portions are always anisotropic, which results in that the outer walls of these portions are rough or have steps leading to losses in these portions.

SUMMARY OF THE INVENTION

Now, for the envisaged field of telecommunication applications, there is a demand for electro-optical circuits or increasingly higher performance, which are increasingly more strongly miniaturized and are increasingly less expensive, i.e. of a simpler form.

The present invention permits of solving these problems by means of a switching element such as defined in the opening paragraph, characterized in that it moreover includes a strip of the same semiconductor material as the guides, which extends between the latter continuously from one guide to the other over a coupling length between the points at distances $-D/2$ and $+D/2$ from the origin on the longitudinal axis of symmetry of the system of the two guides, this axis being assumed to be oriented in the direction of propagation of the light in the guides, the region of the system between said points constituting the switching zone, and in that the electrodes are at least three in number, of which a first electrode permits of applying a reference voltage to the substrate, a second electrode extends substantially at the surface of the second guide from a point $-D$ to a point $-\epsilon$, $\epsilon$ being small with respect to D, and a third electrode extends substantially at the surface of the first guide between a point $+\epsilon$ and a point $+D$, these second and third electrodes forming strips whose longitudinal axes of symmetry enclose with the optical axis of the second and first guides, respectively, an angle $\theta$ defined on first approximation by the relation $\theta \approx 2(n_1-n_0/n_1)$ whose apex is situated substantially on the optical axis of the guides at the point $-\epsilon$ and at the point $+\epsilon$, respectively.

According to a more elaborate embodiment of the switching element in accordance with the invention, the latter moreover comprises fourth and fifth electrodes symmetrical to the second and third electrodes, respectively, with respect to the longitudinal axis of symmetry of the guides.

According to a preferred embodiment, this switching element moreover comprises a sixth electrode in the form of a strip extending substantially from the point $-D$ to the point $+D$ on the zone lying between the two guides and over a width measured perpendicularly to the orientated axis of symmetry, which does not exceed the distance d separating the guides, this electrode being disposed so as not to be in electrical contact with another electrode.

According to the invention, a switching matrix can moreover be formed comprising a number N of inputs $I_1, I_2 \ldots I_N$ and a number of outputs $O_1, O_2 \ldots O_N$, between which the switching operation takes place, characterized in that it comprises a number $N(N-1)/2$ of switching elements of one of the preceding types arranged in a group of five on N optical guides disposed in parallel at equal distances between the N inputs and the N outputs.

In these conditions, the device according to the invention has inter alia the following advantage:

The dimensions of a switching element parallel to the direction of propagation of the light is very small with respect to that of such an element according to the prior art;

the strips forming the optical guide as well as the switching zone can be realized parallel to a crystallographic direction. Consequently, they can be formed either by local epitaxial growth or by anisotropic etching, these methods providing for the strips flat lateral surfaces permitting of obtaining a satisfactory confinement of the light and minimum losses;

the distance between the strips forming the guides is not critical. Therefore, the device is of a simple construction;

The strips forming the guides can be parallel to a crystallographic direction throughout their length. It is not necessary to provide curved sections to connect the outputs and the inputs of the switching elements to the guide sections serving for the transport of the light to another switching element;

numerous switching elements can be provided on a guide without the latter changing its direction. Therefore, a matrix if formed of the desired number of wave guides all parallel and all equidistant without the repetition pitch being so critical as according to the prior art. The system is therefore of a particularly simple construction;

only the electrodes are arranged in a direction which can be different from the crystallographic axes. However, they are formed by a masking system well known to those skilled in the art and easy in use;

due to the fact that the dimensions of the switching element are very small and due to the fact that several elements can be arranged very close to each other on each system of guides, the surface area occupied by a switching matrix can be very small. The number of elements is moreover smaller than the number of elements necessary according to the prior art for a comparable matrix;

the switching element according to the invention permits either the operation just mentioned of switching from one guide to the other or the multiplexing of signals of different wavelengths.

BRIEF DESCRIPTION OF THE DRAWINGS

The invention will be understood more clearly by means of the following description illustrated by the accompanying diagrammatic Figures, of which.

DETAILED DESCRIPTION OF THE PREFERRED EMBODIMENTS

Figure 1A:
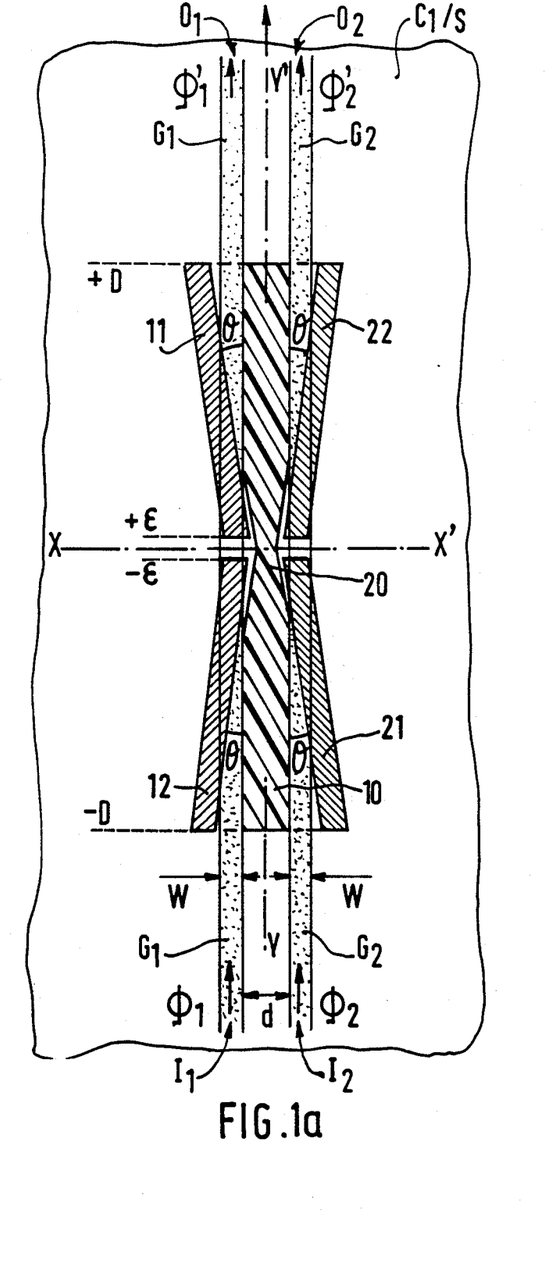
FIG. 1a shows the switching element according to the invention in plan view.

FIG. 1a therefore shows diagrammatically in plan view a switching element according to the invention. This element comprises two optical guides $G_1$ and $G_2$ formed on the surface of a substrate S. The substrate is formed from a semiconductor material having a refractive index $n_0$. The optical guides $G_1$ and $G_2$ are strips of a semiconductor material having a refractive index $n_1$ such that:

$$n_0 < n_1,$$

which permits of confining the light in the guides $G_1$ and $G_2$.

The guides $G_1$ and $G_2$ have parallel to the plane of FIG. 1a and perpendicularly to their optical axes a dimension w. On the other hand they are separated by a distance d, the so-called lateral distance, which is sufficiently large to ensure that the light transported through one of the guides does not pass into the other guide by coupling.

A luminous flux $\phi_1$ can be injected at the input $I_1$ of the guide $G_1$ and a luminous flux $\phi_2$ can be injected at the input $I_2$ of the guide $G_2$. A luminous flux $\phi_1'$ can be collected at the output $O_1$ of the guide $G_1$ and a luminous flux $\phi_2'$ can be collected at the output $G_2$ of the guide $G_2$. These fluxes are transported through the guides in the directions indicated by the arrows in FIG. 1a.

The guides $G_1$ and $G_2$ and the intermediate zone 3 of the guides are provided with electrodes 10, 11, 12, 21 and 22.

Figure 2:
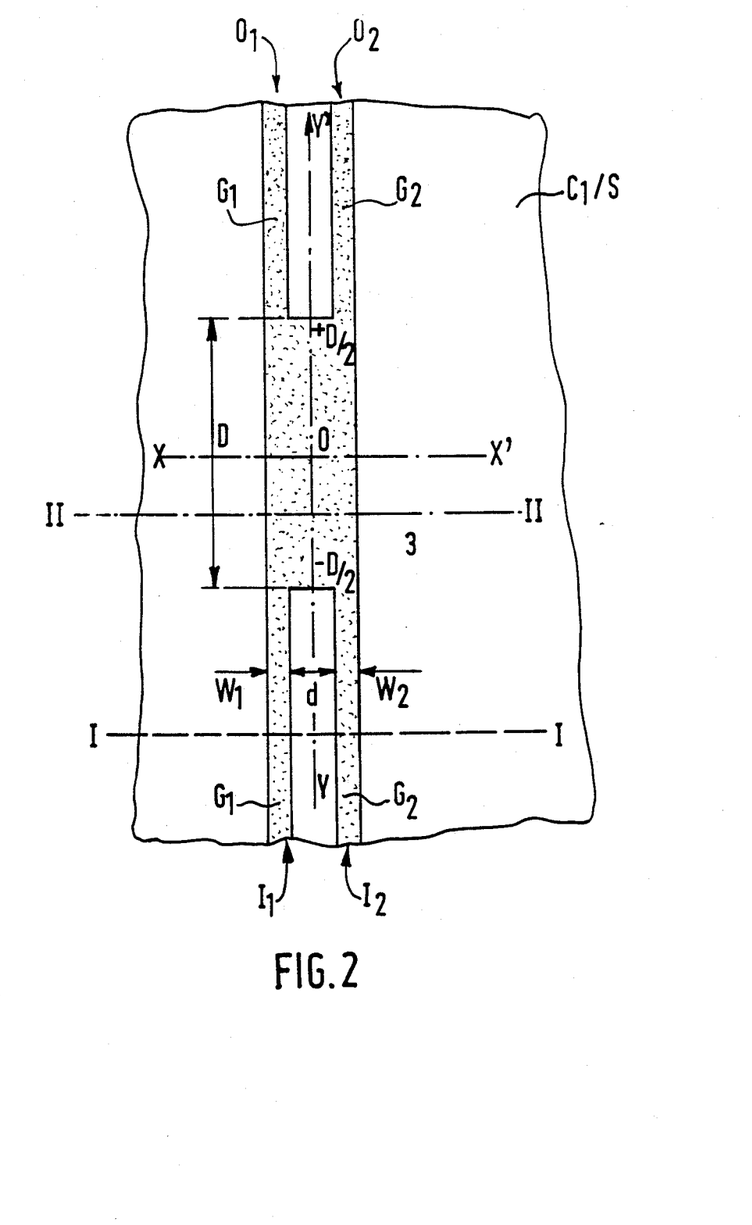
FIG. 2 shows the switching element witout its electrodes in plan view.

FIG. 2 shows the respective configurations of the intermediate zone 3, i.e. the switching zone just mentioned, and of the guides $G_1$ and $G_2$. The switching zone 3 is formed by a strip of the same semiconductor material as the guides, which extends between the latter and connects them to each other over a length D measured parallel to their longitudinal axis of symmetry YY' assumed to be oriented in the direction of propagation of the light, i.e. from Y to Y' in FIG. 1a. The switching zone 3 therefore extends from the abscissa $-D/2$ to the abscissa $+D/2$ measured along the axis.

A contract electrode 10 extends at the surface of this switching zone parallel to the axis of the guides. Its dimensions are at most equal to the dimension d of the intermediate zone of the guides perpendicularly to their axes and larger than the dimension D parallel to the axis of the guides. Favourably, the electrode 10 can have in this direction a dimension approximately equal 2 D and can hence exceed the intermediate zone by a value D/2 on either side. The electrode 10 has on the other hand in its central part a part of reduced width so that its dimensions perpendicularly to the guides will be therein smaller than d. This measure serves to permit of positioning the electrodes 11,12,21 and 22.

The contact electrode 11 has the form of a strip having a width equivalent to the dimension w of the guides. The axis XX' being the axis of symmetry of the switching region perpendicular to the axis YY' of the guides, the electrode 11 extends from a point situated on the guide, $G_1$ in the proximity of this axis XX' and, for example, at the abscissa $+\epsilon$ measured along YY', $\epsilon$ being chosen to be very small with respect to D, to the point situated at the abscissa $+D$ measured along YY' and in such a manner that the longitudinal axis of the strip 11 encloses with the optical axis of the guide $G_1$ an angle $-\theta$ measured trigonometrically, the apex of this angle being situated on the guide $G_1$ at the abscissa $+\epsilon$. The electrodes 12,22 and 21 are derived from the electrode 11 by symmetry with respect to the axes XX' and YY'.

The angle $\theta$ chosen for positioning the electrodes 11,12,21 and 22 with respect to the axes of the optical guides is determined on first approximation from the relation:

$$n_1 \sin \theta_1 = n_0 \sin \theta_0,$$

in which $n_1$ is the index of the guide and $n_0$ is the index of the medium adjacent to the walls of the guide, especially the index of the substrate S, and $\theta_1$ and $\theta_0$ are the angles of incidence and of refraction in these media. In order that the light is confined in the guide, it is necessary that $$\sin \theta_0 \approx 1$$

and hence:

$$\sin \theta_1 \approx n_0/n_1 = 1 - \Delta_n/n_1$$

with $$\Delta_n = n_1 - 0$$

and $$\theta = \pi/2 - \theta_1$$

$$\cos \theta = 1 - \Delta_n/n_1$$

$$1 - \theta^2/2 \approx 1 - \Delta_n/n_1.$$

Therefore, it is preferred to arrange the electrodes at an angle given by the relation 1:

$$\theta^2 \approx 2\Delta_n/n_1.$$

In an embodiment, the electrodes 10,11,12,21,22 are not at all in contact with each other and can therefore be polarized independently of each other.

In another embodiment, the electrodes 11 and 12 on the one hand and the electrodes 21 and 22 on the other hand are connected to each other and are all fed at the same time.

In one or the other of these embodiments, a supplementary electrode 1 in contact with the substrate S is provided and the polarization voltages are applied between this electrode 1 connected, for example, to earth and either the electrodes 11 and 21 connected to each other or the corresponding electrodes 12 and 22 connected to each other or the four electrodes 11,12,21 and 22 connected to each other or the electrode 10.

Hereinafter one of the preceding hypotheses will always be assumed to be operative.

Figure 1B:
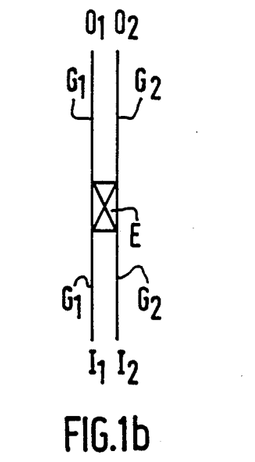
FIG. 1b is a symbolic representation of such a switching element.

FIG. 1b shows a symbolic representation of the switching element E constituted by the system shown in FIG. 1a applied to the guides $G_1$ and $G_2$.

Figure 5A:
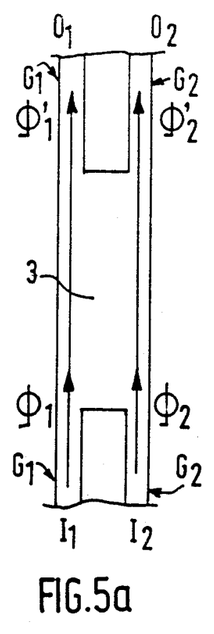
FIG. 5a shows the path of the light beams in the case in which the switching is blocked.

The operation of the switching element according to the invention is as follows:

A luminous flux $\phi_1$ having a wavelength $\lambda_1$ is injected at the input $I_1$ of the guide $G_1$ and a luminous flux $\lambda_2$ is injected at the input $I_2$ of the guide $G_2$;

A voltage is applied to the electrode 10 in such a manner that a negative index variation appears in the intermediate zone 3. In these conditions, the beams $\phi_1$ and $\phi_2$ transported through $G_1$ and $G_2$ cannot provide for the passage offered by the intermediate zone 3 for passing from one guide into the other. They circular continuously in the guides into which they have been injected, as illustrated by FIG. 5a, and are collected at the outputs $O_1$ and $O_2$, respectively.

At the switching stage just mentioned, the voltage is no longer applied to the electrode 10 and a voltage is applied to the electrodes 12 and 22 at the same time.

Figure 5B:
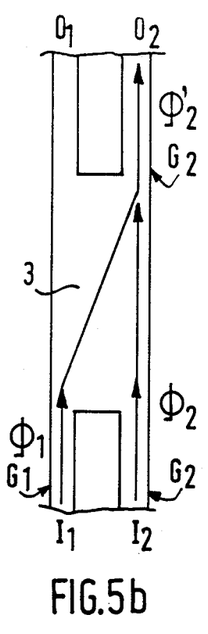
FIG. 5b shows the path of the light beams in the case of a multiplexing of the guide 1 in the guide 2.

The voltage applied to the electrode 12 causes the beam $\phi_1$ to deviate towards the intermediate zone 3 and the voltage applied to the electrode 22 rectifies the beam $\phi_1$ so as to position it in the axis of the guide $G_2$ in which it continues to propagate. At the output $O_2$ a beam $\phi'_2$ is thus collected, which comprises both the beam $\phi_2$ having a wavelength $\lambda_2$ and the beam $\phi_1$ having a wavelength $\lambda_1$. There is a multiplexing of the signals having a wavelength $\lambda_1$ and a wavelength $\lambda_2$ from the guides $G_1$ and $G_2$ in the guide $G_2$. The output $O_1$ shows on the other hand an extinction. This stage is illustrated in FIG. 5b.

Figure 5C:
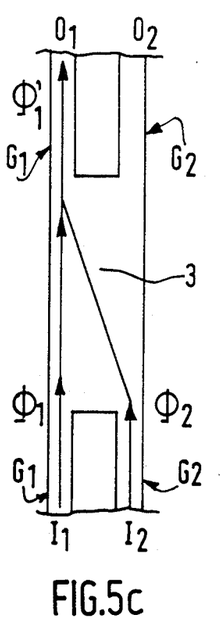
FIG. 5c shows the path of the light beams in the case of a multiplexing of the guide 2 in the guide 1.

On the contrary, by feeding of the electrodes 21 and 11, the multiplexing of the signals having wavelengths $\lambda_1,\lambda_2$ from the guides $G_1$ and $G_2$ in the guide $G_1$ can be obtained with extinction of the output $O_2$. This stage is illustrated in FIG. 5c.

Figure 6:
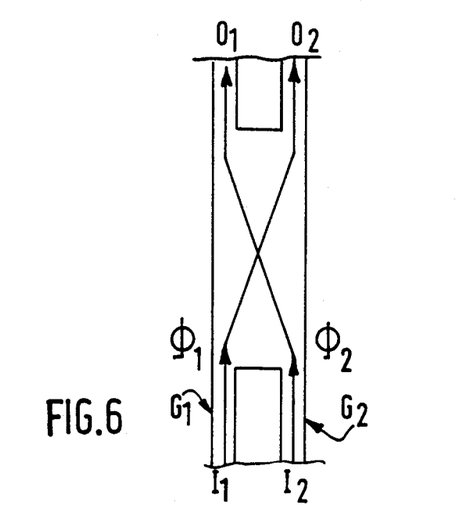
FIG. 6 shows the path of the light beams in the case of the switching guide 2 to the guide 1 and of the guide 1 to the guide 2.

In the case in which all the electrodes 11,12, 21 and 22 are connected to each other, the beam $\phi_1$ injected at $I_1$ in the guide $G_1$ is deviated towards the intermediate zone 3 and emanates at $O_2$ through the guide $G_2$, while the beam $\phi_2$ injected at $I_1$ across the latter beam in the intermediate zone 3 and emanates at $O_1$ through the guide $G_1$. There is a simple switching of the beams $\phi_1$ and $\phi_2$, which may be of the same wavelength $\lambda$.

This case is illustrated in FIG. 6.

The switching operation can be obtained either by electrooptical effect or by injection of charge carriers.

I. Embodiment of the electrooptical type.

Only by way of example, a favourable method of manufacturing a switching element according to the invention will be described hereinafter; this method utilizes the epitaxial growth from the liquid phase (LPE) or the epitaxial growth from the vapour phase (VPE), the latter being preferred.

An orientated monocrystalline substrate S (FIGS. 3a, 4a) is first formed having a conductivity type n+, i.e. doped with 2 to $4.10^{18}$ impurities/cm$^3$, or such an N+ layer is formed at the surface of a semi-isolating substrate. At the surface of this layer S of the n+ type, grooves are formed by anisotropic etching parallel to a crystallographic axis so taht these grooves have longitudinal walls formed by crystalline facets.

Figure 3A:
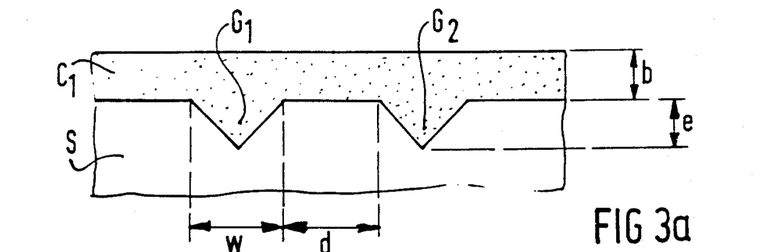
FIGS. 3a and 3b show the switching element in a sectional view taken on the axis I—I in two different embodiments.
Figure 4A:
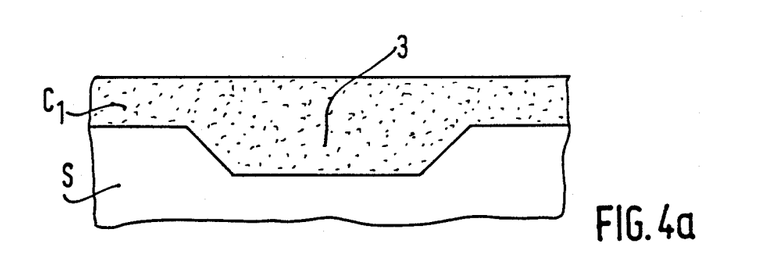
FIGS. 4a and 4b show this switching element in a sectional view taken on the axis II—II in the two respective embodiments of FIGS. 3a and 3b.

Subsequently, a layer $C_1$ having a conductivity type $n-$, i.e. doped at a value lower than $10^{16}$ impurities/$cm^3$, is formed at the surface of the layer S, preferably by VPE growth. In fact, by this method, the rate of growth from the longitudinal walls of the groove can be higher than the rate of growth on the upper surface of the layer S. Therefore, due to the VPR growth, the upper surface of the layer $C_1$ will be of the planar type. Such a result could be less readily with the types of growth designated as MOVPE or MBE, which mostly form layers of uniform thickness and do not permit of obtaining a planar structure from a groove. The grooves thus filled by the layer $C_1$ form the guides $G_1$, $G_2$ and the intermediate zone 3, as shown in FIG. 3a in a sectional view taken on the axis I—I of FIG. 2 or in FIG. 4a in a sectional view taken on the axis II—II of FIG. 2.

The substrate S is advantageously chosen to consist of gallium arsenide (GaAs) doped with silicon to obtain the $n+$ conductivity type.

The layer $C_1$ is advantageously formed from gallium arsenide (GaAs) of the n-type intentionally undoped, which permits of obtaining the $n-$ conductivity type. The surface of the substrate on which the guides are formed is preferably a crystalline face having no orientation (1 0 0). The axis of the optical guides is preferably orientated parallel to the crystallographic axis [1 1 0] or to the crystallographic axis [1 $\bar{1}$ 0].

Figure 3B:
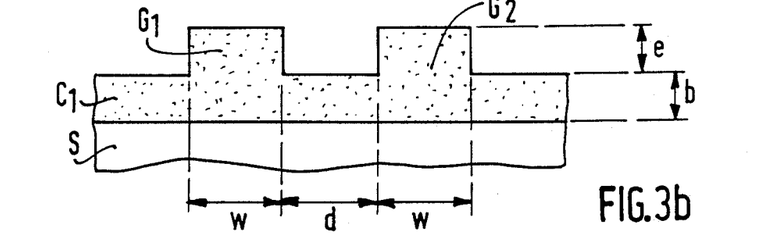
Figure 4B:
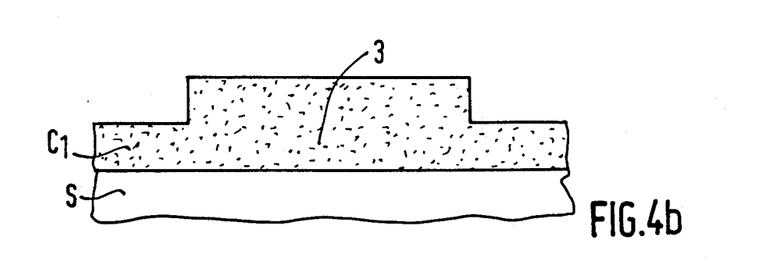

According to a method of forming the guides less favourable for the invention, but nevertheless usable, the substrate S is not etched, but has a flat surface. The layer $C_1$ is formed at the surface and the form of the guides $G_1$ and $G_2$ and of the intermediate zone 3 is then limited by a mask. A step of etching the layer $C_1$ is then carried out around the guides $G_1$, $G_2$ and the masked zone 3 so that after etching the guides and the zone 3 appear in relief, as shown in FIG. 3b in a sectional view taken on the axis I—I of FIG. 2 and in FIG. 4b in a sectional view taken on the axis II—II of FIG. 2. This method of forming the guides is less favourable than the method including the step of forming the guides in grooves and a planarized surface due to the fact that the electrodes can less readily be formed on a non-planar surface. However, if this method is used, preferably the materials and orientations described above are chosen.

In these embodiments, the layer $C_1$ has a thickness of the order of 2.5 $\mu m$, the guides have a width $w \approx 3$ to 4 $\mu m$ are separated by a distance $d \approx 8$ to 10 $\mu m$ and have a transverse dimension (cf. FIGS. 3 and 4) $b = 4$ $\mu m$ and the zone 3 has a longitudinal dimension (cf. FIG. 2)

$$D \approx 500 \ \mu m.$$

At the surface of the wave guides $G_1$, $G_2$ and of the zone 3 the electrodes 10, 11, 12, 21 and 22 are then formed. In order to obtain an electrooptical operation of the switching element according to the invention, these electrodes will be of the Schottky type, i.e. will be formed, for example, by means of a multiple layer of titanium-platinum-gold (Ti-Pt-Au).

Figure 7:
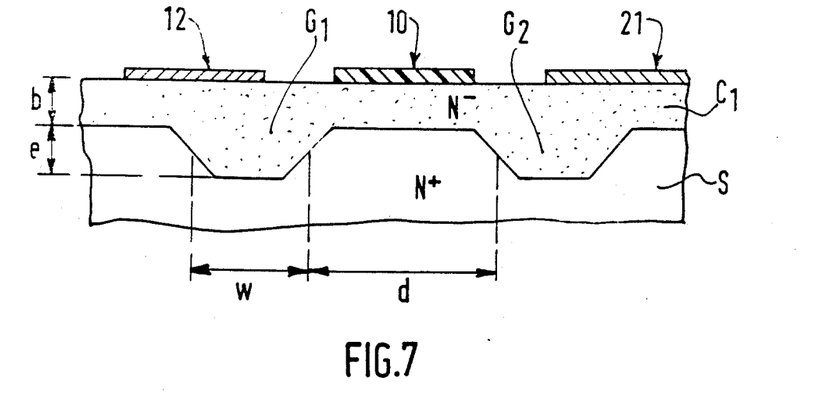
FIG. 7 shows in sectional view the switching element according to the invention in a first embodiment.

The structure of this device is shown in sectional view taken on the axis I—I in FIG. 7. As shown in this FIG. 7, the grooves forming the guides $G_1$ and $G_2$ have in sectional view a shape slightly different from that of FIG. 3a. This is simply due to the fact that here crystallographic facets of different orientation are shown, which van also be obtained in the method described above.

The angle $\theta$ having been chosen so as to satisfy the relation:

$$\theta_2 = 2\Delta_n/n$$

and with electrooptical operation $\Delta_n$ being given by the relation:

$$\Delta_n \approx (\tfrac{1}{2})n^3{}_1 r_{41} E,$$

in which E is the energy due to the electrical field and $r_{41}$ is a constant of the medium, the preceding relation thus becomes $$\theta^2 \approx n^2{}_1 r_{41} E.$$

II. Embodiment of the charge carrier injection type.

The optical guides can be formed by means of the same methods as those described above, i.e. either from grooves in a substrate or in form of strips in relief in a layer $C_1$.

However, the material chosen for the substrate S will now advantageously be indium phosphide (InP) of the $n+$ type at $4.10^{18}$ impurities/$cm^3$. The material chosen for the layer $C_1$ will be indium phosphide (InP) of the $n-$ type at $10^{15}$ residual impurities/$cm^3$.

Moreover, the electrodes must now be constituted by the superimposition of a layer $C_2$ of indium phosphide (InP) of the $p+$ type at $10^{19}$ impurities/$cm^3$ and of a layer forming an ohmic contact, for example a gold-germanium (Au-Ge) alloy. The impurities chosen for obtaining the $n+$ conductivity will be, for example, sulphur (S) and for obtaining the $p+$ conductivity zinc (Zn).

As already stated above, the polarization voltages of the electrodes are applied between these electrodes and a supplementary electrode 1 in contact with the substrate and advantageously connected to mass. This electrode 1 is formed in an exposed zone of the substrate in the proximity of the switching element either on the opposite surface of the substrate or on the surface receiving the switching element. This electrode 1 is of the ohmic type.

If a voltage $V > 0$ is applied to the electrodes 10, 11,12,21,22, the switching element operates by injection of charge carriers. If a voltage $V < 0$ is applied to these electrodes, the system can operate by electrooptical effect, as in the embodiment 1.

Figure 8A:
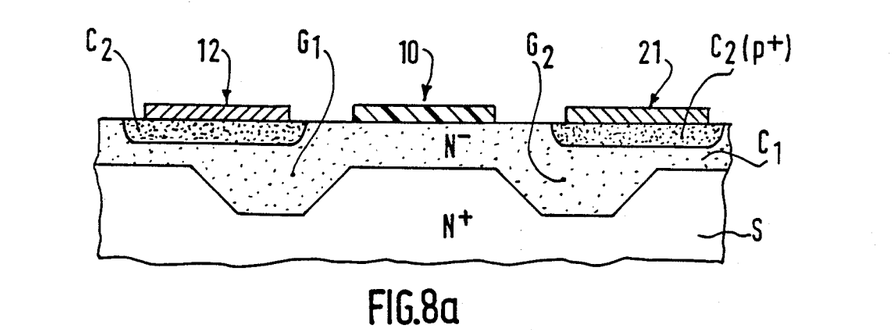
FIG. 8a shows in sectional view the switching element in a second embodiment.

The structure of this system is shown in sectional view taken on the axis I—I of FIG. 2 in FIG. 8a.

Figure 8B:
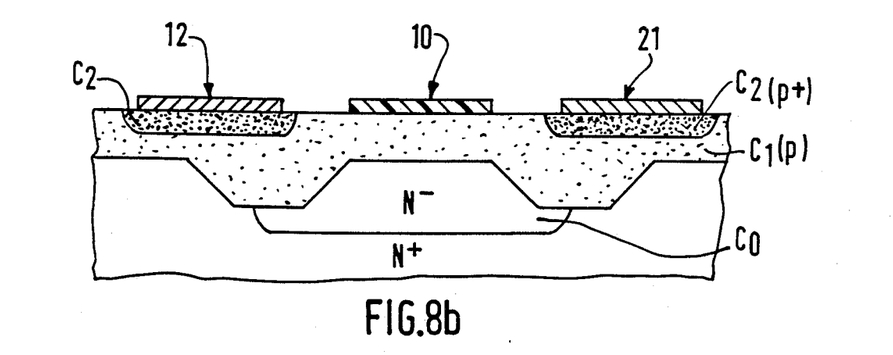
FIG. 8b shows in sectional view the switching element in a third embodiment.

Another structure shown in FIG. 8b can also be favourable for the operation of the switching element described in the present embodiment. The substrate S consists of indium phosphide (InP) of the $n+$ type. A layer of $C_0$ of $n-$ conductivity made of indium phosphide (InP) is formed under the guides $G_1$ and $G_2$, which are then made of p-type gallium arsenide (GaInAs-p). The contacts are formed as before by means of the layer $C_2$ of indium phosphide of the $p+$ type and of an ohmic contact of a metal alloy, such as gold-germanium.

In the latter case, the layers $C_0$, $C_1$, $C_2$ are chosen, like the substrate S, so that their relative indices permit of confining the light in the guides. The layer $C_0$ can have a residual doping of the order of $10^{15}$ impurities/$cm^3$.

Figure 9:
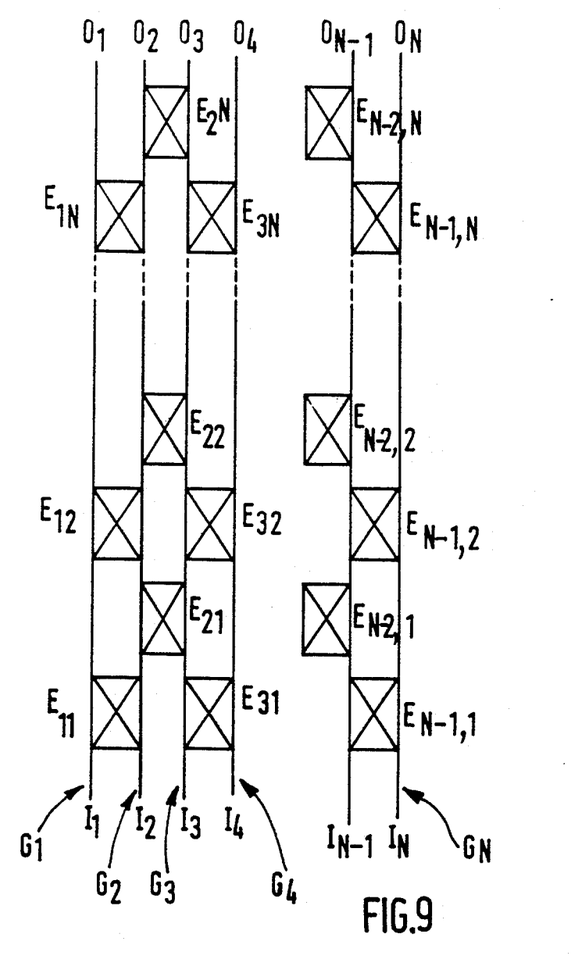
FIG. 9 shows diagrammatically in plan view a switching matrix composed of elements according to the invention and comprising N inputs and N outputs.

By means of the switching element according to the invention, a matrix can be formed for switching from FIG. 9.

N guides $G_1, G_2, \ldots G_N$ are formed in parallel and spaced apart by a lateral distance d on a semiconductor substrate, for example by means of one of the methods described above. The switching elements E according to the invention are arranged in a group of five, as shown in FIG. 9. In order to obtain the switching from the N inputs to the N outputs, it is necessary to use only a number:

$$C_N = N(N-1)/2$$

of elements of the type E, which is markedly smaller than the number of switching elements used to obtain the same result in the matrix according to the prior art, this number being $N^2$. Moreover, each element having a considerably smaller surface area, the matrix will then have a very small surface area compatible with the idea the designer has about an integrated circuit. Finally, the various constructions suggested to form the switching element and the manufacture of integrated circuits are synergetic. This permits of monolithically integrating on the same substrate as the matrix a read-only memory for storing the states of the electrodes required for switching and to thus obtain a simple and effective control of the matrix.

It should be noted that with respect to the prior art the losses in the guides of such a matrix are balanced, which offers a great advantage. In fact, the path for switching from $I_1$ to $O_N$ is practically not longer than the path for switching from $I_{N-1}$ to $O_N$; moreover, the losses in each switching element are extremely low because the light is always guided.

What is claimed is:

1. An optical switching element including two parallel optical guides $G_1$ and $G_2$ each constituted by a strip of a semiconductor material having a first refractive index $n_1$ formed on a semiconductor substrate of a material having a second lower refractive index $n_0$ such that the light is confined in the strip forming the guide, the dimensions of these guides being such that they each transport a monomode wave and the switching operation being obtained by the effect of voltages applied to electrode arranged in the switching zone, characterized in that it moreover includes a strip of the same semiconductor material as the guides, which extends continuously between the latter from one guide to the other over a coupling length D between the points at distances $-D/2$ and $+D/2$ from the origin on the longitudinal axis of symmetry of the system of the two guides, this axis being assumed to be oriented in the direction of propagation of the light in the guides, the region of the system between said points constituting the switching zone, and in that the electrodes are at least three in number, of which a first electrode permits of applying a reference voltage to the substrate, a second electrode extends substantially at the surface of the second guide from a point $-D$ to a point $-\epsilon$, $\epsilon$ being small with respect to D, and a third electrode extends substantially at the surface of the first guide from a point $+\epsilon$ to a point $+D$, the second and third electrodes forming strips whose longitudinal axes of symmetry enclose with the optical axes of the second and first guides, respectively, an angle $\theta$ defined on first approximation by the relation:

$$\theta = 2(n_1 - n_0)/n_1,$$

whose apex is situated substantially on the optical axis of the guides at the points $-\epsilon$ and $+\epsilon$, respectively.

2. A switching element as claimed in claim 1, characterized in that it comprises comprises a fourth and a fifth electrode, respectively, symmetrical to the second and third electrodes with respect to the axis of symmetry of the guides.

3. An element as claimed in claim 1, characterized in that it further comprises a sixth electrode in the form of a strip extending substantially from the point $-D$ to the point $+D$ on the zone lying between the two guides and over a width measured perpendicularly to the orientated axis of symmetry, which does not exceed the distance d separating the guides, this electrode being disposed so as not to be in electrical contact with one of the preceding electrodes.

4. An element as claimed in claim 1, characterized in that the substrate is made of gallium arsenide (GaAs) of $n^+$ conductivity type, in that the strips forming the optical guides are made of gallium arsenide (GaAs) of $N^-$ conductivity type and in that the electrodes are of the Schottky type, and in that the operation is of the electrooptical type.

5. An element as claimed in claim 1, characterized in that the substrate is made of indium phosphide (InP) of $n^+$ conductivity type, in that the strips forming the optical guides are made of indium phosphide (InP) of $n^-$ conductivity type and in that the electrodes are formed by the superimposition of a layer of indium phosphide (InP) of $p^+$ conductivity type and an ohmic contact, and in that the switching element operates by injection of charge carriers.

6. An element as claimed in claim 1, characterized in that the substrate is made of indium phosphide (InP) of $n^+$ conductivity type in that the strips forming the guides are made of indium phosphide (InP) of p-conductivity type, in that a layer of indium phosphide (InP) of $n^-$ conductivity type is disposed at the surface of the substrate limited by the switching zone under the guides and the intermediate zone between the guides, in that the electrodes are formed by the superimposition of a layer of indium phosphide (InP) of $p^+$ conductivity type and an ohmic contact, and in that the switching element operates by injection of charge carriers.

7. An element as claimed in claim 1, characterized in that the element is incorporated in a matrix comprising $N(N-1)/2$ of these switching elements, said matrix having N inputs and N outputs, said switching elements being arranged in groups of five, on N parallel and equidistant optical guides.

8. A method of manufacturing an optical switching element having two parallel optical guides G1 and G2, characterized in that it comprises the following steps:
(a) forming a substrate of semiconductor material of the $n^+$ conductivity type having a refractive index $n_0$,
(b) etching said substrate to form linear and parallel grooves spaced apart by the lateral distance d between the guides and to form a cavity of the same depth as the grooves, which extends continuously between the guides over said lateral distance d and over a longitudinal coupling length D,
(c) forming at the surface of the substrate and in the grooves and cavities a layer of a semiconductor material of the $n^-$ conductivity type having a refractive index $n_1$ such that: $n_0 < n_1$, (d) forming in contact with the substrate in exposed zone of the substrate in the proximity of the switching zone a first electrode of the ohmic contact type, and (e) forming second and third electrodes at the surface of the guides G2 and G1, respectively.

9. A method as claimed in claim 8, characterized in that it further comprises the step of:

(f) forming fourth and fifth electrodes at the surface of the guides $G_1$ and $G_2$, respectively.

10. A method as claimed in claim 9, characterized in that it further comprises the step of:

(g) forming at the surface of the intermediate zone between the guides a sixth electrode.

11. A method of manufacturing the element claimed in claim 8, characterized in that steps b and c are replaced by the following steps:

(b') forming at the surface of the substrate two parallel strips $G_1$ and $G_2$ forming the guides and having a width w and a thickness e spaced apart by a lateral distance d made of a semiconductor material of $n^-$ conductivity type having a refractive index $n_1$ such that $n_0 < n_1$;

(c') forming at the substrate between the two guides $G_1$ and $G_2$ a strip of the same material as the guides disposed continuously from one guide to the other over the distance d transversely to the longitudinal axis of symmetry of the system of the two guides and over a distance D parallel to this axis of the same thickness e as the guides.

12. A manufacturing method as claimed in claim 8, characterized in that it further comprises immediately after step a the supplementary step a' of:

(a') forming a layer of $n^-$ conductivity at the substrate area intended to receive the intermediate zone.

13. A method as claimed in claim 12, characterized in that the n-conductivity layer at the substrate area is obtained by ion implantantion.

* * * * *